United States Patent [19]
McVenes

[11] Patent Number: 5,379,211
[45] Date of Patent: Jan. 3, 1995

[54] PRESS FOLDER PRESET SYSTEM

[75] Inventor: Timothy D. McVenes, Byron, Ill.

[73] Assignee: Brown Printing Company, A Division of Gruner & Jahr Printing and Publishing Co., Waseca, Minn.

[21] Appl. No.: 59,303

[22] Filed: May 11, 1993

[51] Int. Cl.$^6$ ............... G05B 19/18; G06F 15/46; B41F 13/24
[52] U.S. Cl. ............... 364/167.01; 364/469; 364/471; 101/248
[58] Field of Search ............ 364/167.01, 188, 469, 364/471, 559; 101/336, 248; 270/4, 20.1

[56] References Cited

U.S. PATENT DOCUMENTS

| | | | |
|---|---|---|---|
| 3,734,487 | 5/1973 | Treff | 270/52 |
| 4,346,446 | 8/1982 | Erbstein et al. | 364/469 |
| 4,366,542 | 12/1982 | Anselrode | 364/469 |
| 4,484,522 | 11/1984 | Simeth | 101/248 |
| 4,495,582 | 1/1985 | Dessert et al. | 364/469 |
| 4,545,031 | 10/1985 | Kobayashi | 364/471 |
| 4,888,717 | 12/1989 | Ditto et al. | 364/559 |
| 5,043,904 | 8/1991 | Sikes et al. | 364/469 |

Primary Examiner—Paul Gordon
Attorney, Agent, or Firm—Haugen and Nikolai

[57] ABSTRACT

A personal computer (PC) and a programmable controller are used to automatically reposition the turn bars and compensation rollers used in a folder for a web printing press. By providing linear transducers for each of the turn bars and compensation rollers disposed at each level of the folder, analog information as to the actual position of each is provided to the programmable controller. The PC provides digital information to the programmable controller as to the desired position and an error signal is computed for controlling the operation of the drive motors so as to reduce the error signal to zero. When setting up the folder to run a new job, the turn bar settings and compensation roller positions are manually accomplished, but upon command, the settings for that job may be stored in the memory of the PC for use the next time that particular job is to be run.

6 Claims, 5 Drawing Sheets

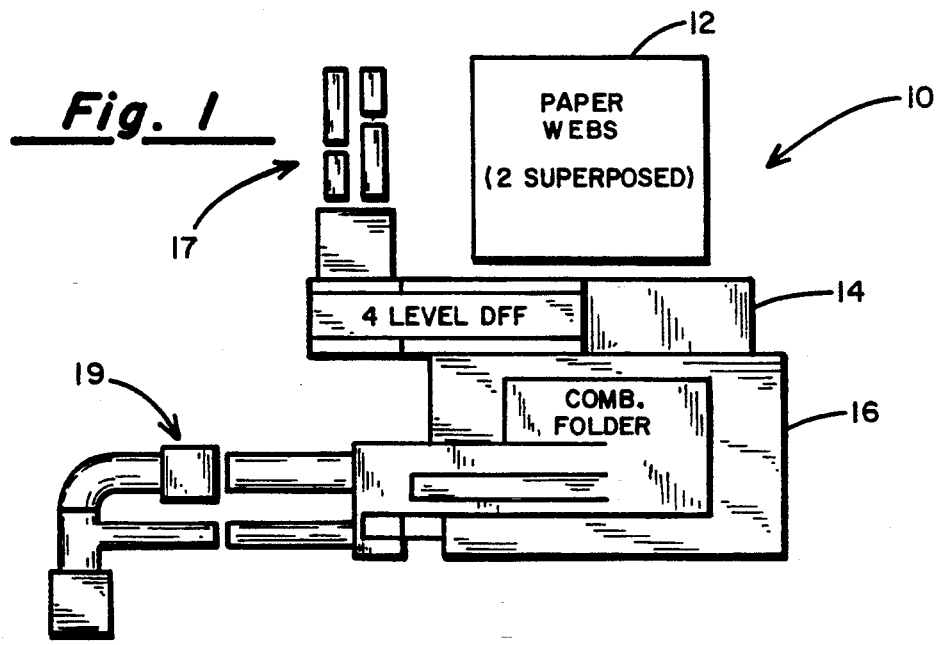

| FRIDAY<br>APRIL 9, 1993 | PRESS 1211<br>HARRIS M-1000 AII | 1:20 PM |
|---|---|---|

WARNING     FOLDER PRESET SYSTEM     WARNING

```
FOLD TYPE: 2    1= DFF    2= 1/4 FOLD    3= TABLOID        PRODUCT SIZES
                                                        1) LESS THAN 6 3/8"
TURNBAR SETUP:  HOLE#  SIDE      TURNBAR SETUP          2) 6 3/8" - 6 3/4"
     (BTM) LEVEL #1:   0     0   HOLE#: ENTER THE NUMBER 3) 6 7/8" - 7 1/4"
          LEVEL #2:    0     G   OF THE HOLE WHERE THE  4) 7 3/8" - 7 1/2"
          LEVEL #3:    0     0   TURNBAR IS PLACED FOR  5) 7 5/8"
          LEVEL #4:    0     G   EACH LEVEL. ENTER A 0  6) 7 3/4"
          LEVEL #5:    0     0   IF LEVEL IS NOT USED.  7) 7 7/8"
     (TOP) LEVEL #6:   0     G                          8) 8"
                                 SIDE: ENTER THE SIDE THAT 9) 8 1/8"
          PRODUCT SIZE: 1        THE RIBBON WILL EXIT,   10) 8 1/4"
                                 O=OPERATOR  G=GEAR.    11) 8 3/8"
          CHECK FOR PRESETS (Y):                        12) 8 1/2" - 8 3/4"
                                                        13) 8 7/8" - 9 1/4"
          ENTER LEVEL 1 HOLE #, 0-8:                    14) MORE THAN 9 1/4"
```

STACKER STATUS: COMMUNICATIONS OFF     PALLETIZER STATUS: COMMUNICATIONS OFF
SYSTEM INFORMATION: DO NOT MOVE TURN/COMP MOTORS

PRESS FOLDER PRESET SYSTEM

BACKGROUND OF THE INVENTION

I. Field of the Invention

This invention relates generally to the field of magazine printing systems, and more particularly to an automated system for defining the presets for the folder used, so that set-up and conversion of the folder from job to job to accommodate differing signature sizes, paper sizes and page make-ups can be facilitated.

II. Discussion of the Prior Art

In the printing industry, offset presses are used to print inked images onto a web of paper moving through the press at high speeds. The web may then be slit into plural ribbons and the ribbons are then routed through a folder where the signatures are formed in an appropriate order so that when cut and assembled on a bindery line, the pages of the magazine will be in proper order. Typical of the type of equipment on which the present invention finds use is the Harris Model M1000B which may incorporate a double former folder and/or a combination folder. It should be understood, however, that the present invention is not limited only to this particular equipment, but may find application on any web press incorporating turn bars and compensation rollers in its folder station.

Typical folders may have a plurality of levels where each level is equipped with a turn bar and an associated compensation roller. The turn bars and compensation rollers are movable by servomotor driven lead screws. The turn bars are moved to adjust the lateral positioning of the ribbons passing there over while the compensation rollers are used to adjust the advance or retard of the ribbons longitudinally, so that when passing through a cutter, the cut will provide appropriate margins at the beginning and end of each page and will not be cut in mid-page.

In the past, in setting up a job, the press operator would first determine for each folder level which holes the turn bars on that level should be inserted into. If the particular job had been run before, the operator would typically have recorded the hole positions and the paper path route in a notebook or the like for future reference. Once the turn bars are properly assembled into the appropriate positioning holes, it is still necessary for the operator to "fine tune" the positions of those turn bars as well as those of the compensation rollers. This is done by jogging manual push-buttons to apply current to the lead screw drive motors to drive the screws in the forward or reverse direction, while noting the way in which the signatures are folded and cut. When folding and cutting is as desired, normal operation can resume. Since this must be done for each of the plural folder levels in use at the time, the setup operation can be relatively time consuming, even for an experienced operator. For a novice operator, the task tends to be quite formidable. If the setup takes a relatively long time to accomplish, there is an attendant waste of paper taking place until the proper positioning of the turn bars and compensating rollers has been attained.

As an example, it has been found that for successive different runs, a trained operator may take typically 15–20 minutes in reconfiguring the folder between successive job changes. Considering that the rate of paper flow through the press is approximately 700 feet per minute, 14,000 feet of paper may typically flow through the system before the folder is properly adjusted to produce usable copy.

In that a printing company commonly prints a variety of publications in accordance with a predetermined time schedule, there is real value in being able to preset the folder section of the press to a specific configuration associated with a previously run job after it has been operated for other publications so that valuable time and materials will be saved.

The preset system of the present invention is universally modifiable to any two nose double former folder and any ribbon decks of four or six levels. The configuration can be set in a password protected screen.

SUMMARY OF THE INVENTION

It is accordingly a principal object of the present invention to provide an improved, automated system for facilitating the set-up of a folder section of an offset printing press.

A more specific object is to provide a microprocessor based control system which functions to return the folder's turn bars and compensation rollers to pre-established positions earlier created at a time that a particular setup was made for running a job whenever it is desired to rerun that job or a job with the same page, width and page layout following the running of a different job.

In accordance with the invention, the apparatus for facilitating the setup of a folder section of a web printing press to carry out a particular specified job where the folder is of the type having a plurality of motor-driven turn bars for adjusting the lateral position of a print ribbon flowing through the folder section and a plurality of motor-driven compensation rollers for adjusting the advance and retard of the ribbons relative to a page cutting device has a linear transducer associated with each of the plurality of motor-driven turn bars and motor-driven compensation rollers used in the multilevel folder. The linear transducer produces an electrical current signal whose amplitude is proportional to the displacement of the turn bars and compensation rollers from predetermined reference locations. A microprocessor, including a memory means, is included for storing data corresponding to a desired target position for each of the plurality of turn bars and compensation rollers for a plurality of job names. A programmable controller is coupled to receive the electrical signals from the linear transducer, as well as the data from the memory of the microprocessor. The programmable controller operates to generate motor drive signals related to the extent of displacement of each of the turn bars and compensation rollers from their desired target positions associated with the specified job configuration. The motor drive signals are then fed to the motor-driven turn bars and the motor-driven compensation rollers to effect repositioning thereof to the desired target position of each.

In order to obtain and store the desired target locations for the turn bars and compensation rollers, means are provided for manually actuating the motor-driven turn bars and motor-driven compensation rollers to reposition same until the operator is satisfied that the margins on the printed page are as they should be. The programmable controller includes a means for receiving the electrical signals from the transducing means and producing digital data words representative of these electrical signals when the turn bars and compensation rollers are at their desired target position. Once so formatted, the memory of the microprocessor can be used to store the digital data words for subsequent readout whenever it is again desired to run that particular job.

DESCRIPTION OF THE DRAWINGS

The foregoing features, objects and advantages of the invention can best be understood from the following detailed description of a preferred embodiment of the invention, especially when explained in conjunction with the accompanying drawings in which:

FIG. 1 is a schematic diagram of an offset printing press and folder assemblies used therewith;

FIG. 3 illustrates the display screen layout;

DESCRIPTION OF THE PREFERRED EMBODIMENT

Figure 2:
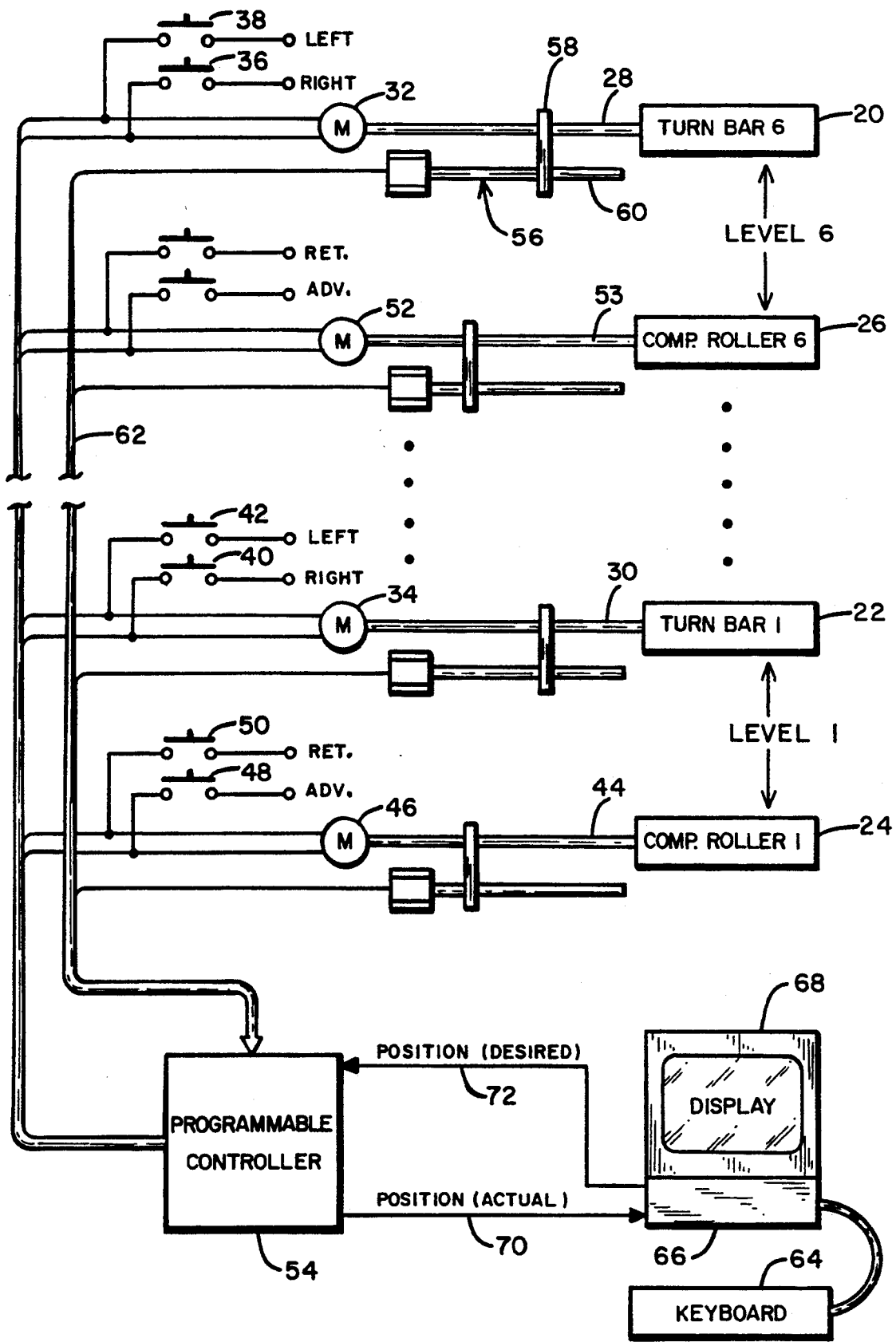
FIG. 2 is a schematic diagram of the system of the present invention.

Referring to FIG. 1, there is indicated generally by numeral 10 an offset printing press and folder assemblies used therewith. Two paper webs, which are superimposed, are identified by numeral 12 and they are arranged to enter a four-level, double former folder station 14 which, in turn, feeds into a combination folder 16. Either folder may be used depending upon the size configuration and necessary page count of the product being produced. The press as well as the double former folder and combination folder are all standard apparatus, well known to those having ordinary skill in the art. Using this setup, the operator has the option of creating a tabloid fold, a combination quarter fold and a double former fold.

While not shown in FIG. 1, a slitter is generally provided for dividing the webs 12 into at least two ribbons which are then routed over appropriate turn bars and compensation rollers disposed at the different levels of the folder assemblies so as they are brought together and folded, the resulting signatures will be in a proper order to be assembled as magazines when the signatures are processed in a bindery line (not shown).

Depending upon the type of fold desired, the page size and the flow path of the ribbons, and further depending on whether the web is used standard or reversed, different magazine runs vary from one to the other.

While not specifically illustrated in the plan view of FIG. 1, those skilled in the art appreciate that the press and folder are comprised of a plurality of levels (six or less) and associated with each level is a turn bar and a compensation roller for controlling the movement of the ribbons through the former and folder. The turn bars at each particular level are adapted to span between two parallel, spaced-apart blocks having a plurality of equally spaced holes extending along the length of the blocks. The blocks are, in turn, coupled via a fine threaded lead screw, to drive motors whereby the relative position of the two blocks and therefore the position of the angled turn bar supported between them can be adjusted. Movement of the turn bars results in a shift of the ribbon in a direction transverse to the direction of flow of the paper thereover. Likewise, motor-driven lead screws associated with the compensation rollers can impart precise movement to those compensation rollers, whereby the ribbon can be advanced or retarded in the longitudinal direction allowing it to be cut midway between two successive pages on the ribbon rather than through the middle of a page.

After being cut, the paper is delivered on conveyors 17 or 19 to a stacker where the sections are assembled in a "brick" form to be pelletized, either manually or by a robot.

Turning now to FIG. 2, there is shown a schematic electrical and mechanical diagram of the apparatus employed in implementing the folder preset scheme of the present invention. As is shown in this drawing, and as those skilled in the art appreciate, the typical folder used with a web printing press may include a plurality of levels and disposed at each level is a ribbon turn bar as at 20 and 22 and a compensation roller as at 24 and 26. In such typical prior art folder, the turn bars are supported at each end in a slide block (not shown) slidably mounted to a frame member where each of the slide blocks includes a plurality (typ. 8) holes which are generally equally spaced along the longitudinal dimension of the slide blocks. The shaft of the turn bar can be fitted into any one of the holes on one slide block and into the corresponding hole on the corresponding slide block. Thus, the position at which the angled turn bar is disposed can be selected.

To provide a fine adjustment of the turn bar position, one of the two slide blocks for the turn bar is coupled to the traveling nut of a lead screw as at 28 and 30 in FIG. 2. The lead screw is, in turn, adapted to be driven by a servo motor, such as motors 32 and 34, in FIG. 2. Depending upon the direction of rotation of the motor, the turn bar associated with it can be finely adjusted to cause the paper ribbon traversing it to be moved to the right or left by jogging the normally open push-button switches 36, 38 associated with motor 32 and the similar switches 40 and 42 associated with motor 34.

The compensation rollers 24 and 26 for levels 1 through 6, respectively, are also arranged to be driven by a motor-driven lead screw. More particularly, as shown in FIG. 2, compensation bar 24 is operatively coupled to a lead screw arrangement 44 coupled to a servomotor 46 having manual push button switches 48 and 50 interposed between a voltage supply (not shown) and the associated motor. Depression of the push button switch 48 operates to advance the web while operation of the push button switch 50 serves to retard it. Those familiar with known prior art press folders understand that the compensation bars are driven at each end thereof by a single motor operating through an appropriate differential gear mechanism to drive a pair of lead screws which, in turn, drive frame-mounted slide blocks to which the opposed ends of the compensation rollers are journaled.

The description of the preferred embodiment thus far presented concerns a conventional commercially-available folder. In implementing the present invention, there is further provided a programmable controller module 54 that is operatively coupled to the servomotors such as motors 32, 34, 46 and 52.

Furthermore, in accordance with this invention, associated with the lead screw of each of the turn bars and compensation rollers on each level is a linear transducer which is operative to output a voltage or current signal (analog) proportional to the extent of displacement of a traveler element relative to a predetermined reference point. In FIG. 2, the linear transducer associated with turn bar 20 and its lead screw 28 is identified by numeral 56 and its traveler is identified by numeral 58. As the lead screw 28 is rotated by motor 32 to reposition the turn bar 20, the traveler 58 moves along the transducer's shaft 60. A typical transducer which may be employed is that produced by the Magnetek Company as its Model No. 950. It produces a voltage output that varies linearly between about 1 volt DC and 5 volts DC for the full length movement of the traveler 58 along its shaft 60.

In a similar fashion, a linear transducer is associated with each of the other turn bars and compensation rollers employed in the folder. As such, the actual position of each turn bar and roller is fed as an analog signal through the cable 62 to the programmable controller 54.

Also coupled to the programmable controller 54 is a personal computer, such as an IBM PS-2 or one of the clones of that machine now available through several companies. It includes a keyboard 64 for providing manual inputs to a computer 66. Also associated with the computer is a display module 68. The computer 66 includes a semiconductor memory (not shown) for storing the applications program yet to be described as well as data defining a desired position for each of the turn bars and compensation rollers included in the press folder and with variables associated with a plurality of jobs.

Assuming that a particular printing job had earlier been run and the manual switches 36, 38, 40, 42, 46 and 48 had been used by the operator to set the positioning of the turn bars and compensation rollers so as to produce signatures with appropriate margins at the top, bottom and each side, the analog signals from each of the linear transducers are fed over the cable 62 to an analog to digital converter (not shown), forming a part of the programmable controller 54, and the resulting digital data pertaining to the actual position of each of the turn bars and compensation rollers is fed, via cable 70, to be stored in the memory of the computer 66. At a later time, when it is desired to run the same job, the press operator may call up a program which presents a menu on the display 68. The menu contains a number of prompts which causes the operator to enter in operands and addressing information for reading out the previously stored desired positions for the turn bars and compensation rollers associated with that job, with the positional information being fed over the cable 72 to the programmable controller 54. The programmable controller is operative to then compare the desired position information with the existing actual position information coming from the linear transducers for then generating drive signals for the motors 32, 52, 34 and 46, whereby those motors are driven until the error signal between the actual position and desired position is reduced to zero. In this fashion, the turn bars and compensation rollers will be moved to their appropriate positions which theretofore had resulted in satisfactory margins when that job had been previously run.

Referring next to FIG. 3, there is shown the screen layout for the display 68 when the folder preset system of the present invention is being used. This operator interface screen has a top title portion 74, a middle application "work area" 76, and at the very bottom are lines 78 for indicating system status. In the application work area, there are three side-by-side sections that comprise the application screen layout. The left section contains all of the input system set-up information, the middle section gives a description for each input, and the right section has the selection for the product size ranges. All inputs are indicated in the lower left corner of the application area. The status of each level to be used in producing the particular signature is displayed to the right of the input line.

In use, the operator turns on the system and when the screen of FIG. 3 is presented on the display, at the left side of the middle portion of the screen, it can be seen that the first input selects the type of fold to be used. A "1" selects "double former fold", a "2" selects "combination quarter fold", and "3" selects "tabloid fold".

Input lines 2 through 5 or 2 through 7 (depending on the number of levels on the folder) contain the turn bar placement and path routing information. For each level, the operator inputs the hole number that the turn bar has been placed at. Also, for each level, when using a double former fold, a "F" is entered if the ribbon on this level uses the front nose or a "B" if the back nose is used. If a quarter fold or tabloid fold is involved, a "O" is entered if the ribbon on the particular level exits out the operator side or a "G" is entered if the ribbon exits the level on the gear side. For any level that is not used, a "O" is entered for the turn bar hole number.

The final setup input line on the screen calls for the width size of the untrimmed signature product. The possible selection for this input are found on the right hand side of the application portion of the screen in FIG. 3. The hole for a double former fold setup and the path routing for the quarter and tabloid fold setups on each particular level automatically indicate if the web is used standard or reversed. Accordingly, the setup information outlined above is all that is necessary for all possible run combinations.

After all the setup information has entered, the bottom line on the left hand portion of the screen prompts the operator to look for presets. Entering a "Y" will start the search for the defined setup. The level number for any found preset will be displayed to the immediate right (the lower center portion of the application area). If no presets are found, a message stating that fact will be displayed and the operator will need to manually preset the folder using the push button switches, all as has been previously described. There are no algorithms incorporated in the controller to calculate turn bar and compensation rollers for first-time setup configurations. If no presets are found, the cursor automatically prompts "Save Preset" but if presets are found, it will continue with the "Start Preset" operation.

In particular, when one or more presets are found, the next prompt presented to the operator will inquire as to whether he wishes to initiate the preset system. Entering a "Y" here will simultaneously start all necessary positioning movements of the turn bars and compensation rollers with no further action required by the operator. The operator is responsible for positioning the turn bars in the proper holes on the slide blocks. This may be done either before or after the automatic presets are made. Technically, the turn bars may be repositioned while the automatic presets are being made. When the automatic movement of the turn bars and compensation rollers begins, all manual positioning switches become disabled and a warning message not to make manual moves appears in the system status line on the display.

At any time while the automatic moves are being made, the operator may stop the preset system by answering "Y" to the "Stop" prompt that appears after the system starts. This may be necessary if the operator notices a mistake in the setup or a run is aborted at the last minute. Regardless, the operator does not have to wait for all moves to stop before setup changes may be initiated.

Also, as was mentioned earlier, the system has the capability of saving preset data. The "Save Presets" prompt appears under the following conditions:
1. After search for presets failed to find any presets;
2. After all automatic preset moves are complete;
3. When the operator answers "Y" to the "Stop Preset" prompt; or
4. When the operator answers "N" to the "Start Preset" system.

When the operator answers "Y" to "Save Presets", the exact position of the turn bar and compensation roller for each level with a hole number greater than "0" is recorded and saved in a file determined by that particular setup.

The operator may also scroll through a job name menu and select the desired job. Such selections would then use a stored look-up table in which all of the folder preset setup variables would be read out. Should this be a first time use of a particular job and run configuration, the folder preset variables will have to be manually entered and subsequently saved to the job name and run configuration. This permits the operator to know what holes in the slide blocks the turn bar should be placed as well as providing automatic fine adjustment of the turn bars and compensation rollers.

Figures 4, 7:
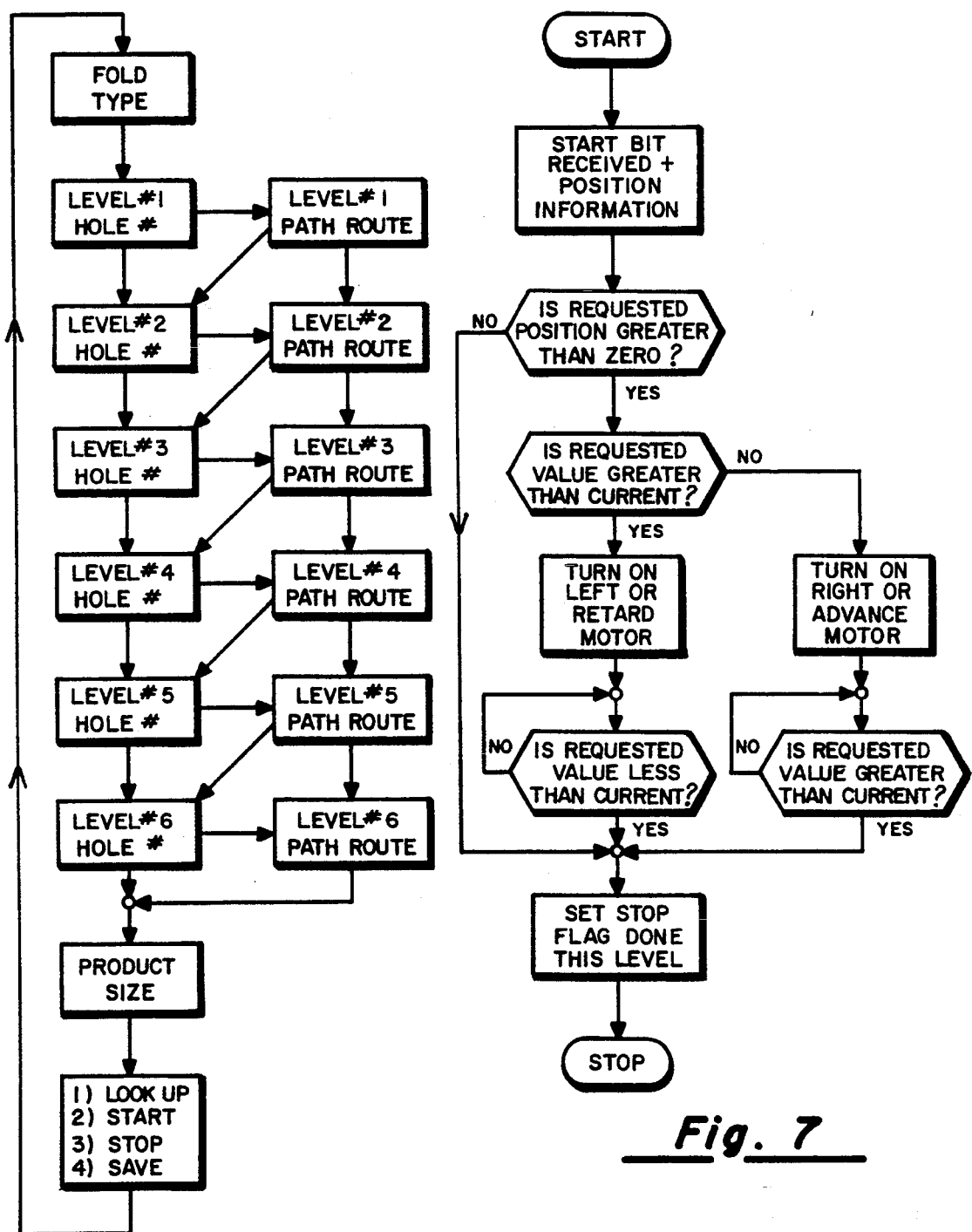
FIG. 4 is a software flow diagram of the steps used in initially creating a display screen used by the operator in creating the necessary data for defining a particular job.
FIG. 7 is a further software flow diagram of the programmable controller operation for either a compensation roller or turn bar for a single level.

Referring now to FIG. 4, there is illustrated a software flow diagram defining the software for controlling the cursor movement through the screen of FIG. 3. Operation starts with the entry of the folder type and then for each level, the hole number employed for the turn bar is entered as is the path route for the ribbon at that level. If the ribbon exits the gear side of the former, a "G" is entered and if it exits the operator side, a "O" is entered. The cursor then sequentially steps through the remaining levels 2 through 6 with the hole number and path route being entered for each. After the path route for level 6 has been entered on the screen, the prompt moves to highlight Product Size and, as previously mentioned, the Product Size is read from a list of available sizes displayed on the right-hand portion of the screen in FIG. 3. Subsequently, the command lines on the screen are sequentially highlighted and, as is indicated by the lower-most block in FIG. 4, the commands include "look up", "start", "stop", and "save".

Figure 5:
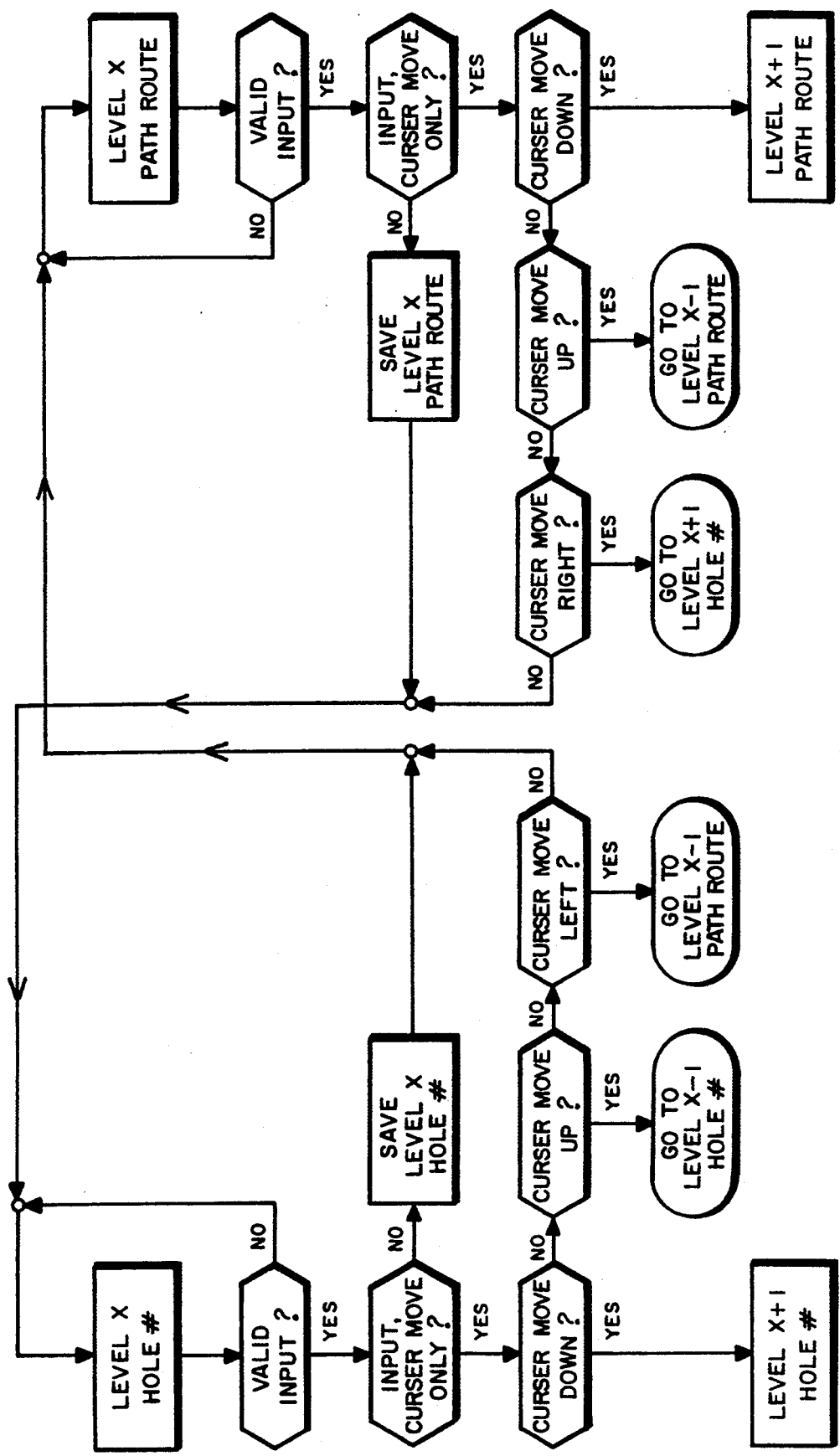
FIG. 5 is a software flow diagram useful in understanding the cursor movements when the display screen is created.

FIG. 5 illustrates a typical cursor movement flow chart used in entering the level hole number and path route. For a given level, e.g., level "X", a hole number for the turn bar is first entered. Then, a test is made to determine whether the number entered is a valid number. If not, control returns to the starting point and the process continues until a valid hole number has been entered. A test is made to determine whether the entry had been only a cursor move; if not, the entered level number and hole number are saved and control passes over to the operation where a path route is now entered for level "X". If the path route so entered is not valid, control loops back until a valid input has been made. At that point, a test is made again to determine whether the input is a cursor move only. If it is not, the path route for level "X" is saved and the series of steps relating to the entry of the hole number is again repeated.

Had the test "input move cursor only?" been answered in the affirmative, a further test is made to determine whether it is to move downward. If so, the next step is to enter the hole number for the next successive folder level. Had the test shown that the cursor move was not down, a subsequent test checks to see if it was to be an up cursor move. If so, the cursor would proceed to the previous level number and hole number that had been entered. If the cursor move was not up, a test is made to see if it was a left cursor move. If so, the cursor is moved to the path route for the proceeding level "X-1".

In a similar fashion, a series of tests are made to determine the direction of cursor movement for the path route as reflected in the flow diagram.

Figure 6:
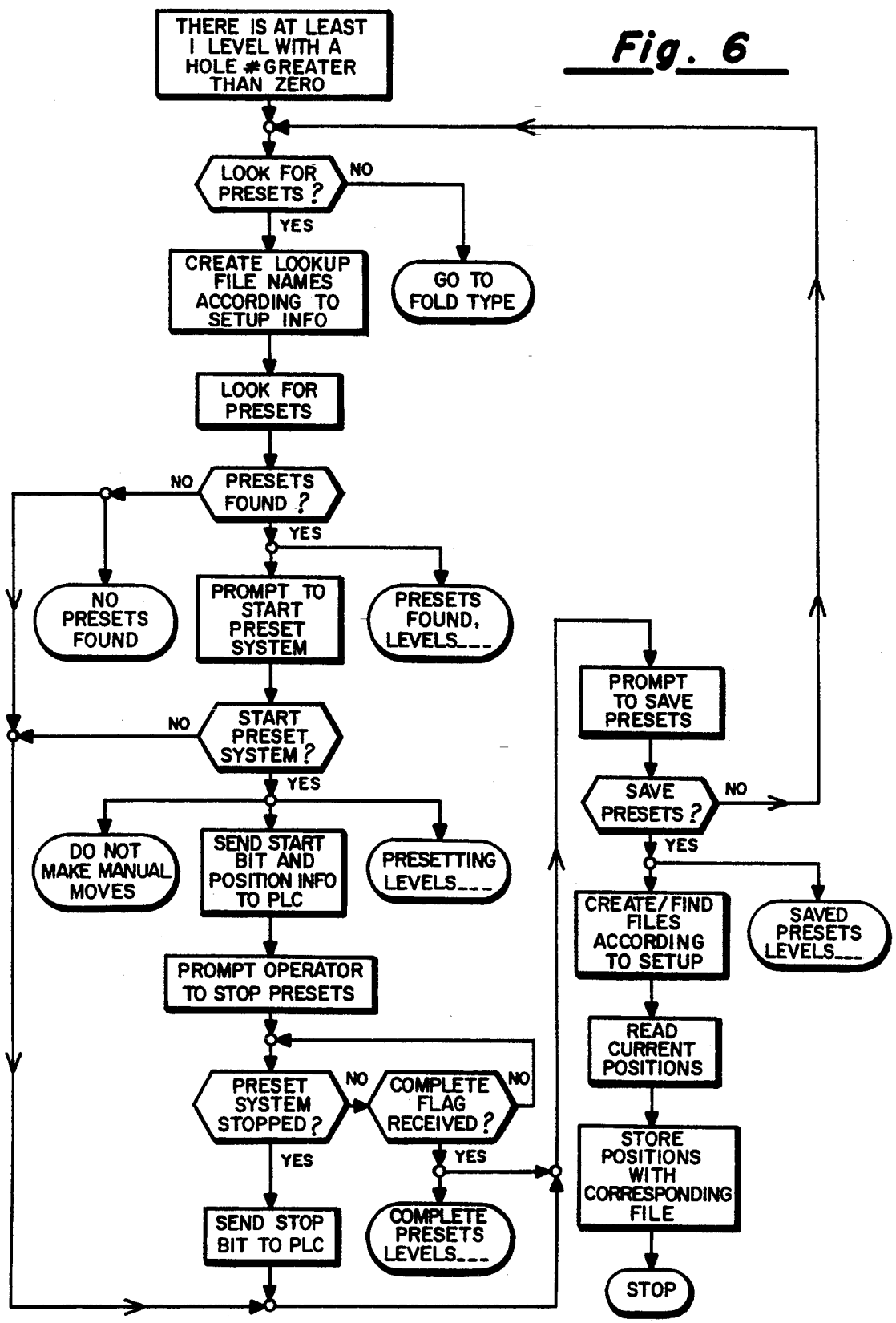
FIG. 6 is a software flow diagram of the preset system control.

Turning now to FIG. 6, there is set forth a software flow chart for the preset system control. If there is at least one level with a hole number greater than zero, a test is made to look for presets and if none are found, control exits to go to the first entry on the screen which is to enter the fold type. Where presets are found, look up file names are created according to the information originally set up. Presets are then again looked for and if none are found, the display screen displays "no presets found". If presets were found, then that fact would also be displayed along with the numbers of the levels where presets had previously been determined. In addition, a prompt to start the preset system is displayed. Once the prompt is there, the operator must respond by entering "Y" or "N". A test is made to determine which entry is made and if the instruction were to start it, the messages "do not make manual moves" and "presetting levels - - - " are presented on the screen. Moreover, a start bit as well as the desired position information is sent from the PC 66 to the programmable controller 54 (FIG. 2). As already mentioned, this causes the actual position data obtained from the linear transducers to be compared digitally to the desired position with any differences comprising an error signal for driving the servomotors in the appropriate direction to cause the turn bar and compensation roller to move to the desired position.

At the same time that the start bit and position information are transmitted to the programmable controller, the flow chart of FIG. 6 reflects that the operator is provided with a prompt as to whether to Stop Presets. If a "Y" for "yes" is entered, this fact is detected and a stop bit is sent to the PLC to immediately disable the affected drive motor. If no order to stop the preset system is provided by the operator, a test is made to determine when the repositioning had been completed. When completed, the statement "Complete Presets Levels (numbers)" is provided on the display screen.

In either event, control passes to cause the prompt "Save Presets" to be displayed. If an "N" for "no" is entered by the operator, control returns to the starting point in FIG. 6. If the instruction is to save the presets, the message "Saved Presets Levels (numbers)" is entered and, at the same time, previously stored files are updated in accordance with the existing setup or, alternatively, a new file is created in accordance with the existing setup where no previously presets had been stored. The current positions of the turn bars and compensation rollers is read and stored in the file that had earlier been located or established.

FIG. 7 is a software flow diagram representing the operations performed by the programmable controller. When a start bit and position information is received from the PC 66, a test is made by the microprocessor in the programmable controller to determine whether a position requested by the PC is greater than zero. If not, no repositioning is required and a stop flag is set and no movement of the motors takes place. If a requested position differed from zero, another test is made to determine whether the requested position value is greater than the then-existing value being sensed and relayed to the programmable controller by the linear transducer involved. If it is, the motor for the turn bar displaces the slide block to the left or if it is the compensation bar, the retard motor is started. Then, a test is continually made until it is determined that the desired position value becomes less than the current value at which point it is known that the affected turn bar or compensation roller has reached its target position. At this point, a stop flag is set and control for this level holds until the same operations reflected by the flow chart of FIG. 7 are carried out for all moves.

It was earlier assumed that the test as to whether the desired position value was greater than the then-existing position value was true. If it had not been, the motor associated with the turn bar would be rotated to move the slide block to the right, and if it were the compensation roller, its slide would be moved in the "advance" direction. The test as to whether the desired position value is greater than the existing position value and when the result is affirmative, a stop flag is set and control for this level holds until all moves are complete. When all moves are complete, the programmable controller sends a stop to the PC.

The flow charts of FIGS. 4, 5, 6 and 7 are sufficient to permit a skilled programmer to write the appropriate instructions for the PC and for the microprocessor in the programmable controller to execute the steps set out in the flow chart. Accordingly, it is deemed unnecessary to set out in this specification the program in either source code or object code.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for facilitating the set-up of a folder section of a web printing press to carry out a particular specified job, said folder being of the type having a plurality of motor-driven turn bars for adjusting the lateral position of a paper ribbon flowing through said folder section and a plurality of motor-driven compensation rollers for adjusting the advance and retard of said ribbons relative to a page cutting device, comprising:

(a) a plurality of linear transducing means, individually associated with each of said plurality of motor-driven turn bars and said motor-driven compensating rollers, for producing electrical signals proportional to the displacement of said turn bars and compensation rollers from predetermined reference locations;

(b) memory means for storing data corresponding to a desired target position for each of said plurality of turn bars and compensation rollers for a plurality of possible job names;

(c) programmable controller means coupled to receive said electrical signals from said plurality of linear transducing means and said data from said memory means relating to a specified job name for generating motor drive signals related to the extent of displacement of each of said turn bars and compensation rollers from said desired target positions for the specified job name; and (d) means for applying said motor drive signals to said motor-driven turn bars and said motor-driven compensation rollers to effect closed-loop repositioning thereof to said desired target positions of each.

2. The apparatus as in claim 1 and further including:

(a) means for manually actuating said motor-driven turn bars and said motor-driven compensation rollers to reposition same at said desired target locations for each; and (b) means in said programmable controller for receiving said electrical signals from said linear transducing means and producing digital data words representative of said electrical signals when said turn bars and compensation rollers are at said desired target position; and (c) means for storing said digital data words in said memory means for subsequent readout.

3. The apparatus as in claim 2 wherein said memory means is addressable by a job name designation.

4. The apparatus as in claim 1 wherein said folder section includes a plurality of levels with one turn bar and one compensation roller for each of said levels.

5. The apparatus as in claim 1 wherein said memory means comprises a memory for a microprocessor, said microprocessor further including a keyboard for manual entry of data and control commands into said microprocessor and a display terminal for displaying folder setup information in a predetermined format.

6. The apparatus as in claim 7 wherein said folder setup information includes the type of folder to be used, the turn bar placement and path routing for each level, and the page size.

* * * * *